United States Patent [19]

Ritter et al.

[11] Patent Number: 5,439,953
[45] Date of Patent: Aug. 8, 1995

[54] STARCH-BASED MATERIALS AND/OR MOLDED PARTS MODIFIED BY SYNTHETIC POLYMER COMPOUNDS AND PROCESS FOR PRODUCING THE SAME

[75] Inventors: Wolfgang Ritter, Haan; Rainer Bergner, Düeldorf; Wolfgang Kempf, Köln, all of Germany

[73] Assignee: Henkel Kommanditgesellschaft auf Aktien, Duesseldorf, Germany

[21] Appl. No.: 70,409

[22] PCT Filed: Dec. 3, 1991

[86] PCT No.: PCT/EP91/02295
  § 371 Date: Oct. 12, 1993
  § 102(e) Date: Oct. 12, 1993

[87] PCT Pub. No.: WO92/10539
  PCT Pub. Date: Jun. 25, 1992

[30] Foreign Application Priority Data
  Dec. 5, 1990 [DE] Germany ............. 40 38 732.1

[51] Int. Cl.$^6$ .................. C08L 3/02; C08B 30/12
[52] U.S. Cl. ........................ 524/47; 524/52; 524/366; 524/376; 524/386; 524/312
[58] Field of Search ........... 524/47, 52, 366, 376, 524/386, 312

[56] References Cited

FOREIGN PATENT DOCUMENTS

| 0327505 | 8/1989 | European Pat. Off. . |
| 0404727 | 12/1990 | European Pat. Off. . |
| 9001043 | 2/1990 | WIPO . |
| 9005161 | 5/1990 | WIPO . |
| 9010671 | 9/1990 | WIPO . |

OTHER PUBLICATIONS

Chimia 41 (1987); Stepto & Tomka "Injection Moulding of Natural Hydrophilic Polymers in the Presence of Water", pp. 76–81.

*Primary Examiner*—Paul R. Michl
*Assistant Examiner*—LaVonda DeWitt
*Attorney, Agent, or Firm*—Ernest G. Szoke; Wayne C. Jaeschke; Norvell E. Wisdom

[57] ABSTRACT

Disclosed are materials and/or shaped articles based on a starch which has been thermomechanically digested at elevated pressures and temperatures and with the addition of water and/or lower molecular weight plasticizing agents, said starch containing thermoplastic synthetic polymer compounds in an at least largely homogeneous mixture. The materials and/or shaped articles according to the invention are characterized in that their contents of synthetic thermoplastic polymer compounds is derived from aqueous polymer dispersions comprising a disperse polymer phase in an aqueous phase and that the synthetic thermoplastic polymer compounds have been incorporated in the starch in combination with the aqueous phase in such a manner that the starch digestion has been effected by the concomitant use of the aqueous phase of the polymer dispersions. Said materials and/or shaped articles have been preferably produced by a process wherein the starch digestion to form a thermoplastic material has occurred together with homogeneously mixing the aqueous polymer dispersions into the starch in one process step.

10 Claims, No Drawings

STARCH-BASED MATERIALS AND/OR MOLDED PARTS MODIFIED BY SYNTHETIC POLYMER COMPOUNDS AND PROCESS FOR PRODUCING THE SAME

FIELD OF THE INVENTION

This invention relates to improvements in the production of materials and shaped articles made therefrom, said materials being based on modified starch which is present in an intimate mixture with thermoplastic polymer compounds.

STATEMENT OF RELATED ART

Numerous proposals in recent years deal with an attempt to develop high molecular weight polymer compounds of natural origin—and among these especially starch—so that these compounds would find new fields of application. These works, more particularly, have been based on the recognition that native starch in combination with limited amounts of water and/or further auxiliary materials can be converted into a thermoplastic material by means of a thermomechanical digestion, which thermoplastic material is subsequently processable by conventional means, e.g. by procedures of injection molding. More particularly, the thermomechanical digestion using elevated temperatures and elevated pressures can be carried out in conventional extruders before the process step of molding. From the voluminous literature, here reference may be made to R. F. T. Stepto et al., "Injection Molding of Natural Hydrophilic Polymers in the Presence of Water", *Chimia* 41 (1987), No. 3, 76–81, and to the literature cited therein.

A great number of publications deal with the improvement of product properties in the thermoplasticized starch by the use or concomitant use of selected organic auxiliary liquids in the digestion of starch, which may be exemplified by the PCT Patent Application WO 90/05161. Here, for producing a thermoplastically processable starch it is proposed to mix additives with the native or natural starch, which additives decrease the melting temperature of the starch and are additionally characterized by some definite solubility parameter. Furthermore the vapor pressure of the additive should be less than 1 bar in the melting range of the mixture of starch plus additive. As the additives there have been especially mentioned polyfunctional lower alcohols such as ethylene glycol, propylene glycol, glycerol, 1,3-butanediol, diglyceride, corresponding ethers, but also compounds such as dimethylsulfoxide, dimethylformamide, dimethylurea, dimethylacetamide and the corresponding monomethyl derivatives.

Materials based on a starch having been thus thermoplasticized and the molded parts made therefrom are characterized by a seriously restricted utility. The cause thereof is the extreme hydrophilicity of this material. Therefore, the starch modified in such a manner is not suitable for use as a biodegradable polymer material of natural origin which could act as a substitute, much desired today, for polymer compounds of synthetic origin.

Recent proposals deal with an attempt to combine a thermoplasticized starch of the described type with synthetically produced water-resistant polymer compounds to the end that the starch-based hydrophilic polymer compound will be provided with an increased resistance to hydrophilic solvents, while nevertheless substantial proportions of the material or molded part, respectively, will be formed by the thermoplasticized starch. Reference is made to PCT Patent Application WO 90/01 043 among the pertinent literature. Therein it is described to coat hydrophilic polymers such as starch with selected aliphatic polyesters which themselves in turn are degradable, especially by bacteria or fungi. What is described therein, more specifically, is coating molded articles made of starch with polyesters of lower hydroxycarboxylic acids such as glycolic acid, lactic acid, hydroxybutyric acid and hydroxyvaleric acid. Since such layer combinations exhibit a poor mutual adhesion, it is proposed to improve the adhesion by a preceding treatment of the starch surface, and/or by the addition to the coating solution of a solvent or swelling agent for the starch.

Another approach to attain the same goal is described in the EP-A2 327 505. Therein, polymer mixed compositions have been described, which are recovered from a melt of water-containing destructurized starch and at least one substantially water-in-soluble synthetic thermoplastic polymer compound. In practice, the procedure is as follows: First, a thermoplasticized starch is produced from starch in an untreated or pretreated form, with the addition of auxiliary materials such as hydrogenated fatty acid triglycerides, lecithin, and especially water, by a treatment in an extruder at an elevated temperature—for example 175° C.—and the corresponding endogenous elevated pressure, and said thermoplasticized starch is processed to form granules. The water content in the granules is adjusted to about the range of the water content of natural starch (17%). Then the resulting starch granules are mixed with synthetic polymer compounds in the dry state in predetermined mixing ratios. Examples of such thermoplastic water-insoluble polymers of synthetic origin are polyethylene, polystyrene, polyacetals, ethylene/acrylic acid copolymers and ethylene/vinyl acetate copolymers. Then the resulting polymer compositions are processed to form molded parts in the conventional manner in an injection molding machine at a material temperature of 165° C., a cycle time of about 15 seconds, a molding pressure of about 1,600 bar and a back pressure of about 75 bar. The investigated mixing ratios are within the range of from 0.5 to 20% by weight of the added polymer compound of synthetic origin. Thereafter the dimensional stability of the shaped articles is determined under high humidity at room temperature and is compared to the dimensional stability of shaped articles made of only thermoplasticized starch.

The present invention takes up this last-mentioned proposal to mix a thermoplasticized starch, on the one hand, with thermoplastic, preferably largely water-insoluble, polymer compounds of synthetic origin, on the other hand, so as to finally produce a modified polymer mixed product, the properties of which combine important elements from the properties of both of the thermoplasticized starch and the synthetic polymer compounds used. Thus, on the one hand, it is intended to ensure the biodegradability of the materials described by the invention and of the molded articles made therefrom, respectively, while, on the other hand, the polymer mixed composition excels by its significantly improved performance, for example its water resistance, during its use life.

It is a further object of the invention to provide a simplified process for producing the described polymer blends, which process allows to combine and to simultaneously carry out the operations of thermoplastically digesting the starch and of mixing therewith the synthetic polymer compounds, thereby ensuring the easy optimization of homogeneously distributing the polymer compounds to be united, by employing the synthetic polymer materials in comminuted form so that they are extremely fine in particle size—for example in the range of from about 0.1 to 5 μm.

SUMMARY OF THE INVENTION

In a first embodiment, the invention relates to a process for producing polymer-modified materials and/or molded articles based on a starch which has been thermomechanically digested at elevated pressures and elevated temperatures with the addition of water and/or lower molecular weight plasticizing agents, said starch containing synthetic polymer compounds incorporated by mixing in an at least largely homogeneous mixture. Said process according to the invention is characterized in that the starch feedstock is intimately mixed with aqueous polymer dispersions prepared in a known manner and containing a disperse phase of the thermoplastic synthetic polymer(s) in an aqueous phase, the resulting multi-substance mixture further is subjected to the starch digestion at an elevated temperature and an elevated pressure with simultaneous intimate mixing and/or kneading to form the thermoplastically processable starch and, if so desired, the resulting homogenized mixture of polymers is shaped.

Thus, this novel process, more specifically, is characterized in that the digestion of the starch is performed by means of, or at least by concomitantly using, the aqueous phase of the mixed polymer dispersion, whereby there is achieved together in one single process step the indispensable process elements of mixing the substances as homogeneously as possible and of the thermomechanical starch degradation in a known manner at an elevated temperature and an elevated pressure.

Accordingly, the invention in a further embodiment, relates to materials and/or molded articles based on a starch which has been thermomechanically digested, said materials and/or molded articles being characterized in that their contents of synthetic thermoplastic polymer compounds is derived from aqueous polymer dispersions comprising a disperse polymer phase in a continuous aqueous phase and that the synthetic thermoplastic polymer compounds have been incorporated into the starch in combination with the aqueous phase in such a manner that the starch digestion has been effected by the concomitant use of the aqueous phase of the polymer dispersions.

Eventually, in a further embodiment the invention relates to the use of the polymer-modified materials produced according to the invention as a thermoplastic material for the manufacture of molded bodies, sheets and further packaging materials which, in comparison to an unmodified thermoplastic starch, are superior in their performance, while they are nevertheless susceptible to being decomposed by natural degradation processes, for example are rendered putrescible.

DETAILED DESCRIPTION OF THE INVENTION

One essential nucleus of the invention is constituted by the selection of the synthetic polymer materials offered that are intended to be incorporated as mixture components in the materials and/or molded articles according to the invention. Here it is proposed that these polymer components which may be produced by synthesis processes are employed in the form of aqueous dispersions containing the synthetic polymer material in a most finely dispersed state in an aqueous phase. It is basically possible to convert synthetic polymer compounds of any origin into such aqueous formulations, if only the polymer compounds themselves are sufficiently stable to hydrolysis. Here one skilled in the art knows numerous proposals of the state of the art.

Especially suitable synthetic polymer components are the readily accessible and inexpensive products obtained by emulsion polymerization in a known manner by emulsifying the polymer-forming monomer components in a continuous aqueous phase to highest dispersity and subsequent initiation of the polymerization. Nowadays many large scale commercial products of this kind are used, for example, in making coatings, paints, adhesives and the like, where the entirety of properties of the polymer obtained upon coalescing or sintering of the polymer particles can be controlled by appropriately selecting and adapting to each other the polymer-forming monomers. All of these possibilities of modifying the polymer material are also available to the teaching according to the invention. The product properties of the synthetic polymer compounds become an integral constituent of the polymeric mixed material by way of the inclusion of the aqueous phase of the aqueous polymer dispersions employed in the starch in the course of the thermomechanical digestion of the latter, so that the desired intimate mixtures of the thermoplastically deformable polymer components based on both natural materials and synthetic materials will be ultimately formed and then will be available.

Synthetic polymer compounds suitable for use in the form of aqueous dispersions in the process according to the invention, more particularly, include synthetic polymer compounds that are at least largely water-insoluble, such as those described, for example, in EP-A2 327 505 cited above. These polymer compounds, which in turn, more specifically, are thermoplastic, accordingly may be known emulsion polymers and/or copolymers of various kinds. Among these, vinyl polymers such as poly(vinyl ester), e.g. poly (vinyl acetate) and/or poly(vinyl propionate), polystyrene, polyacrylonitrile, poly(vinyl carbazole), polyacrylates and/or polymethacrylates—hereinbelow designated as poly(meth)acrylates—but also any optional copolymers of the classes of substances specified here are mentioned by way of example. Other examples of suitable polymer compounds include polyurethane, polyesters and polyamides.

Preferred synthetic resins within the scope of the teaching according to the invention may be distinguished by softening ranges adapted to suit the process conditions, so that synthetic polymer compounds exhibiting melting points or at least a significant softening within the temperature range of from about 100° C. to 220° C., preferably within the range of from about 100° C. to 190° C., may be preferred. However, in this connection it should be noted that the teaching according to the invention also includes the possibility of a concomitant use of lower molecular weight organic auxiliary components such as low polyfunctional alcohols and/or the partial ethers thereof. Although these auxiliary components in the first place are intended to influence the conversion of starch into a thermoplastically processable material, these auxiliary components nevertheless may also be capable of influencing the synthetic polymer compounds to soften or melt and, thereupon, to be incorporated in the polymer mixture to form a mixture which is as homogeneous as possible.

One preferred embodiment of the invention pertains to using at least in part synthetic polymer components distinguished by a selected combination of antithetic structural elements. This refers to the combination of markedly hydrophilic structural moieties with molecular moieties exhibiting a markedly oleophilic character. In the course of the preparation and production of the polymer mixtures and/or melts, the hydrophilic moieties in the molecule may induce a particularly intensive, usually physical, but possibly even true chemical, attachment of the synthetic polymer molecule to the hydrophilic starch molecule. Then, the manifestation of the polymer mixture—depending on the nature and concentration of the markedly oleophilic molecular moieties—in the final polymer may be guided into the direction as desired. Thus, for example, it will be possible to control the intensity and/or degree of a hydrolytic attack under the conditions of use so that a water resistance sufficient for the period of use of the polymeric mixture is adopted while the degradability thereof by natural rotting is not brought into question.

Examples for clearly hydrophilic moieties in the molecule of the synthetic polymer include alcohol, ester and ether groups or even free acid groups, e.g. carboxyl groups. The oleophilic properties of the total molecule are controllable, for example, via the length and proportion of unsubstituted hydrocarbon moieties in the polymer. This may be evident by citing polymeric vinyl esters and/or polymeric (meth)acrylic acid esters as examples: The length of the ester-forming carboxylic acids in the vinyl ester derivatives or of the alcohols in the (meth)acrylic acid ester derivatives, respectively, affects the degree of the oleophilicity of the final polymer blend. Long-chain carboxylic acids as well as long-chain alcohols—for example either in a range of from $C_{12}$ to $C_{22}$—result in the formation of comparably higher oleophilic properties than does the use of components having comparably shorter chains. Moreover, the qualitative and quantitative compositions of copolymers and/or synthetic polymer mixtures may be selected to satisfy particular needs such as to provide an additional possibility of exerting further influence on performance properties of the polymer blends and/or the shaped articles produced therefrom, respectively. Here the general technical knowledge in the chemistry of synthetic polymers is referred to.

In the materials and/or shaped articles according to the invention the starch usually comprises an amount of at least about from 40 to 50% by weight. It may be convenient that the starch comprises more than about 50% by weight of the solids mixture free from water and lower molecular weight plasticizers. The synthetic polymer compounds content preferably is within the range of at least about 1 to 2% by weight and often comprises up to about 5% by weight, while it may be expedient that the amount of the synthetic polymer compounds is within the range of about from 10 to 45% by weight and preferably within the range of about from 25 to 40% by weight, here also based on the solids mixture free from water and/or lower molecular weight plasticizers.

The water content of the aqueous dispersions of the synthetic polymer compounds may be largely selected freely and may be adapted to suit the conditions of the mixing and starch digestion procedure. It is common to employ aqueous emulsion polymers comprising a continuous aqueous phase and having a water content of said aqueous phase within the range of from 40 to 65% by weight—% by weight here based on the aqueous emulsion (co)polymer.

The starch to be employed in the process may be of any origin. Starch sources such as potatoes, corn, rice, the common kinds of grain and the like may be mentioned in the first place here. Starch is in general employed in powder form. It may be subjected to pre-treatments, if so desired, for example to steps of partial drying, washing with acid and/or further pre-treatments to achieve an especially physical modification of the starch. The water content of the especially natural starch feedstock may vary within wide limits and may comprise, for example, about from 5 to 40% by weight-—based on starch feedstock. Usually the water content of the starch feedstock will be at least about 10% by weight and often is within the range of about from 10 to 25% by weight, again based on starch feedstock.

In addition to or in the place of part of the water employed in the mixture, lower organic plasticizers or plasticizing agents of the type as initially mentioned may be used. These may include, in particular, lower polyfunctional alcohols such as ethylene glycol, propylene glycol, butanediol, glycerol and/or ethers thereof, especially partial ethers. If such lower molecular weight auxiliary components which particularly are starch-compatible are used, the proportional amount thereof is at least about 5% by weight, more expediently within the range of at least about 10% by weight, and more particularly of about from 10 to 20% by weight, based on the total composition.

The procedure of mixing and starch digesting is carried out in devices as known per se for the thermoplastic digestion of starch with water and/or lower organic auxiliary components of the described kind. Accordingly, the step of mixing and starch digesting is carried out in closed kneaders or preferably in extruders. In this step, both residence time and processing conditions are controlled so that it is ensured that the starch is thermoplastically digested and the plasticized synthetic polymer components are admixed to form a mixture which is as homogeneous as possible.

In the working device used, i.e. the extruder, for example, the individual components to be admixed may be supplied in the feed section separately and preferably continuously at rates as required, respectively. In the course of the transportation of the multicomponent mixture in the extruder, the process of homogenizing and mixing as desired especially takes place in the fore compartments. Located downstream thereof is a processing section wherein product temperatures and pressures are maintained, so that the desired thermomechanical starch digestion is effected. At least in this section the product temperatures are above 100° C. and preferably in excess of 120° C., working conditions within the range of from 140° C. to 170° C. being preferred at least in the final phases of the mixing and starch digesting procedure. The resulting working pressure usually conforms to the endogenous pressure of the water-containing material mixture at the given working temperature. The residence times of the multi-substance mixture under the working conditions in general do not exceed a maximum value of about 30 minutes, and preferably a maximum value of about 20 minutes. It may be expedient to employ residence times of the multi-substance mixture under the temperature and pressure conditions of starch digesting within the range of about from 0.5 to 10 minutes, and preferably of about from 2 to 5 minutes.

The homogenized polymer blend may be recovered as extrudate and may be subjected to a shaping step some time later. Nevertheless it is also possible to pass the polymer mixed product to a shaping step directly after its recovery, as has been described for neat thermoplasticized starch in the above cited publication *Chimia* (1987), loc. cit.

If so desired, the polymer blend may be at least partially dehydrated by withdrawing part of the water added for the mixing and digesting procedure. This may be done by evaporating an appropriate amount of water in the course of the mixing and digesting process after the sufficient realization of the desired reactions. However, in a similar manner the primarily obtained extrudates may also be subjected to a step of post-drying for reducing the water contents thereof.

The teaching according to the invention provides considerable advantages over pertinent prior art known hitherto. Although it has been known in principle that the classic product shortcomings of a thermoplastic starch and/or of the shaped articles made therefrom can be overcome by blends of such a thermoplastic starch with less hydrophilic polymers, the processes hitherto known have yet employed comparably complicated multi-step operations. More particularly, prior art requires the separate production of the starch in its thermoplastic form, which implies that the starch a priori, i.e. before it is mixed with the less hydrophilic synthetic polymer compounds, is present already as mixture comprising solvents such as water or glycerol. This requirement has been eliminated by the invention. The previous two-step process—i.e. (1) digestion of starch and production of the thermoplastic starch, and (2) production of the polymer blends with starch—is replaced by the one-step process of the described kind. The synthetic polymers may be employed in their most inexpensive commercially available forms, known to be afforded by the emulsion (co)polymers. Moreover, the superfine particle sizes of such emulsion polymers, known to be in the micrometer range, ensure an especially easy incorporation thereof in the starch feedstock during the mixing step.

EXAMPLES

Example 1

System comprising potato starch/poly(vinyl acetate) dispersion/glycerol

A blend comprising thermoplastic starch and poly(vinyl acetate) is made by co-extruding 3 kg/h of potato starch (20% of water) and 3 kg/h of a poly(vinyl acetate) dispersion {Wormalit ™ PM 4239; solids content: 55%; protective colloid: poly(vinyl alcohol)} admixed with glycerol {composition: poly(vinyl acetate): 32.4%; glycerol: 41.2%; water: 26.5%) in an extruder of the following specification:

| | |
|---|---|
| Extruder: | Werner & Pfleiderer; Continua ™ 37 |
| Operation: | Twin screw, rotating in the same direction |
| Screw diameter: | 37 mm |
| Length: | 26 D |
| Torque per shaft: | 90 Nm |
| Driving power: | 9,5 kW |

The solid and the liquid compounds which have not been mixed are supplied by metered addition at different locations into an unheated feed zone. First the solid powdery potato starch is supplied via a feed screw. Shortly downstream (1 D) the liquid poly(vinyl acetate) dispersion, mixed with the glycerol, is fed into the extruder from the top via a gear pump.

The subsequent mixing stage has been provided to allow the solid and liquid phases to be mixed so as to form a homogeneous mixture. The extruder is externally heated at the section from 5 D to 12 D (Temperature of the heating medium: 130° C.) so that the mixture is simultaneously heated. In the second half of the extruder the starch is thermomechanically digested under the action of the glycerol as well as of the water from the dispersion, resulting in the material being plasticized. At the same time the thermoplastic starch present in the molten state is mixed with the polymer contained in the dispersion. The energy input is by external heating as well as due to the intensive mechanical working by means of the kneading members. At the section from 13 D to 25 D the temperature of the heating medium is 95° C. The thermoplastic material is forced through an apertured plate comprising two holes each 2.5 mm in diameter, whereby the material is provided in the form of flexible strands.

The process parameters to be used on the extruder, the measured values ensuing therefrom and the composition of the raw material are set forth in the following compilation:

| | |
|---|---|
| Making the extrudate | |
| Composition of raw materials: | 40.0% of potato starch |
| | 16.2% of poly(vinyl acetate) |
| | (Wormalit ™ PM 4239) |
| | 20.6% of glycerol |
| | 23.6% of water |
| Extruder: | W & P, C 37 (26 D) |
| Throughput: | 6 kg/h |
| Temperature of heating medium | |
| First half: | 130° C. |
| Second half: | 95° C. |
| Temperature in the extruder: | 110° C. |
| Outlet temperature: | 145° C. to 155° C. |
| Number of revolutions: | 160 rpm |
| Torque: | 45–48% |
| Residence time: | 50 s to 4 min |
| Appearance: | White, opaque, blisters smooth and glossy surface |
| Mechanical properties: | Flexible, difficult to tear |
| Tensile strength at break: | 2 N/mm$^2$ |
| Elongation at break: | 300% |
| Tack: | None |
| Remarks: | No degassing |

The resulting primary extrudate is further processed in a subsequent step by means of a bottle-blowing machine. The operation conditions employed and the properties of the bottles produced thereby are set forth in the following compilation.

| | |
|---|---|
| Processing on a bottle-blowing machine | |
| Extruder: | Bekum BM 201 (50 mm/20 D) |
| Heating temperature: | 120° C. (Feed section to nozzle) |
| Mass temperature: | 130° C. |

| | |
|---|---|
| Number of revolutions: | 56 rpm |
| Blown air: | 2 bar |
| Properties of the bottle: | Bubble-free, white, opaque, smooth and glossy surface, shrinks somewhat, deformation under its own weight, water-impermeable for 5 days. |

No detailed description is given of the extrusion in the subsequent Examples 2 to 4, since it is carried out in the same manner as in Example 1. Further Examples (5 to 22) are summarized as Tables. Also here the procedure is basically the same as in Example 1. The Tables contain the compositions and the metered amounts of the solid and liquid phases separately added into the extruders. Furthermore the extrusion conditions and the properties of the extrudates are reported.

The experiments were carried out on two extruders from the company Werner & Pfleiderer (Continua 37) slightly different in length. The screw configurations of both of the extruders were comparable. The first half of the screw contained two left-hand back-mixing members each 10 mm in length in addition to the regular advancing conveyor members. The second part of the screw contained two kneading members each 40 mm in length in addition to regular advancing conveyor members. The last 4 D of the screws consisted of advancing conveyor members having an elevated pitch so as to generate higher pressures in front of the apertured plate. At this location at there was simultaneously provided a possibility for degassing.

In all experiments the number of revolutions was 160 rpm, and the residence time was between 40 s and 5 min. The dispersions of the Wormalit ™ types PM 4239, PM 4739, PM 4770 and VN 4405 are commercial products supplied by the company Cordes & Co., GmbH (Porta Westfalica), Mowilith ™ DM 155 is a poly(vinyl acetate-co-ethylene-co-acrylic acid derivative) dispersion supplied by the company Hoechst (Frankfurt), and Acronal ™ 81 D is an aqueous dispersion of a copolymer of acrylic acid esters with a concomitant use of acrylonitrile supplied by the company BASF (Ludwigshafen). The designation FA/MAH denotes an aqueous dispersion of a copolymer of a fatty acrylate and maleic anhydride. All polymer dispersions employed have a solids content of from 45 to 60% in their commercially available forms. In part, these dispersion were mixed with water and/or glycerol, depending on the Example.

Example 2

System comprising potato starch/poly(vinyl acetate) dispersion/glycerol

Example 1 is repeated in principle; the alterations effected are apparent from the following list:
a. Making the extrudate

| | |
|---|---|
| Dispersions employed: | Poly(vinyl acetate) dispersion (Wormalit PM 4239, solids content: 55%) protective colloid: poly(vinyl alcohol, company Cordes & Co., GmbH (Porta Westfalica) |
| Composition of liquid phase: | 36.7% of poly(vinyl acetate) 33.3% of glycerol 30.0% of water |
| Feed rate of liquid phase: | 3.5 kg/h |
| Feed rate of potato starch: | 3.5 kg/h |
| Composition of raw materials: | 40.0% of potato starch |
| | 18.4% of poly(vinyl acetate) |
| | 16.7% of glycerol |
| | 25.0% of water |
| Extruder: | Werner & Pfleiderer, Continua 37 (30 D) |
| Throughput: | 7 kg/h |
| Temperature of heating medium | |
| First half: | 100° C. |
| Second half: | 130° C. |
| Temperature in the extruder: | 105° C. |
| Outlet temperature: | 140° C. to 150° C. |
| Number of revolutions: | 160 rpm |
| Torque: | 35–40% |
| Residence time: | 1 min to 4.5 min |
| Appearance: | White, opaque, blisters almost smooth surface |
| Mechanical properties: | Flexible |
| Tensile strength at break: | 2.5 N/mm² |
| Elongation at break: | 130% |
| Tack: | None |
| Remarks: | No degassing | b. Processing on a bottle-blowing machine

Starch-based polymer blends according to the invention can be processed to form molded articles for packaging by using conventionally equipped blow-forming units. It is advantageous to include in the equipment a grooved extruder and having a cooled inlet bushing. The blow head produces good parison once it has been provided with a strainer with offset spiders.

However, in order to produce a good result of plasticizing the following processing conditions are to be adopted:

The process temperature should be selected to be preferably between 120° C. and 150° C. The exact temperature value will depend on the water content of the material.

Within this temperature area the point of operation is selected so that an evaporation of the water does not begin or at least does not result in a formation of bubbles in the extrudate. However, the operating temperature must be close to this critical point in order to achieve the best possible homogeneity.

The pressure for blowing the parison is between 1 and 3 bar. Advantageous is a blowing pressure of 1.5 bar followed by a pressure increase to 6 bar.

It has been shown that an abrupt cooling (quenching) of the thermoplastic starch polymer on mold walls that are too cold may produce embrittlement. Therefore it will make sense to select the mold temperature to be between 16° C. and 24° C.

| | |
|---|---|
| Extruder: | Bekum BM 201 (50 mm/20 D) |
| Heating temperature: | 130° C. (Feed section to nozzle) |
| Mass temperature: | 138° C. |
| Number of revolutions: | 56 rpm |
| Blown air: | 2 bar |
| Properties of the bottle: | Slightly brown, opaque, isolated bubbles, smooth slightly glossy surface, shrinks somewhat, but otherwise dimensionally stable in air, water-imperme- |

-continued

| | |
|---|---|
| able for 1 day. | |

Processing as here shown of the polymer blend on a bottle-blowing machine has been chosen merely for exemplification. Other conventional processing methods may also be employed, among which injection molding, extrusion molding, extrusion blowing, film blowing may be mentioned as examples.

Fields and purposes of utilization for polymer blends according to the invention include, for example, measuring cups for powders, ladles, scoops for powders, carrying handles, sheets, sheet bags, barrier layers for barrier cardboard, ration packages, hollow bodies, bottles, closure members, metering caps, pouring aids, plant pots or geotextile fabrics.

Example 3

System comprising potato starch/poly(vinyl acetate-co-dibutyl maleate) dispersion/glycerol Example 1 is repeated in principle; the alterations effected are apparent from the following list:

| Making the extrudate | |
|---|---|
| Dispersions employed: | Poly(vinylacetate-co-dibutylmaleate) dispersion (Wormalit PM 4739, solids content: 53%) protective colloid: starch ether; company Cordes & Co., GmbH (Porta Westfalica) |
| Composition of liquid phase: | 37.9% of p(VAc-co-DBM) 28.6% of glycerol 33.6% of water |
| Feed rate of liquid phase: | 3.7 kg/h |
| Feed rate of potato starch: | 3.0 kg/h |
| Composition of raw materials: | 36.0% of potato starch 20.8% of poly(vinyl acetate) 15.7% of glycerol 27.5% of water |
| Extruder: | Werner & Pfleiderer, Continua 37 (26 D) |
| Throughput: | 6.7 kg/h |
| Temperature of heating medium | |
| First half: | 150° C. |
| Second half: | 150° C. |
| Temperature in the extruder: | 140° C. |
| Outlet temperature: | 159° C. to 161° C. |
| Number of revolutions: | 160 rpm |
| Torque: | 27% |
| Residence time: | 50 s to 4 min |
| Appearance: | White, opaque, blisters slightly rough surface |
| Mechanical properties: | Flexible |
| Tensile strength at break: | 4.0 N/mm$^2$ |
| Elongation at break: | 360% |
| Tack: | None |
| Remarks: | No degassing |

Example 4

System comprising potato starch/poly(vinyl acetate-co-dibutyl maleate-co-butyl acrylate) dispersion Example 1 is repeated in principle; the alterations effected are apparent from the following list:

| Making the extrudate | |
|---|---|
| Dispersion employed: | Poly(vinylacetate-co-dibutylmaleate-co-butyl acrylate) dispersion (Wormalit PM 4770, solids content: 60%) protective colloid: polyvinyl alcohol, company Cordes & Co., GmbH (Porta Westfalica) |
| Composition of liquid phase: | 53% of p(VAc/DBM/BA) 47% of water |
| Feed rate of liquid phase: | 2.5 kg/h |
| Feed rate of potato starch: | 2.5 kg/h |
| Composition of raw materials: | 40.0% of potato starch 26.5% of p(VAc/DBM/BA) 33.5% of water |
| Extruder: | Werner & Pfleiderer, Continua 37 (30 D) |
| Throughput: | 5 kg/h |
| Temperature of heating medium | |
| First half: | 80° C. |
| Second half: | 150° C. |
| Temperature in the extruder: | 95° C. |
| Outlet temperature: | 130° C. to 140° C. |
| Number of revolutions: | 160 rpm |
| Torque: | 24% |
| Residence time: | 1 min to 4.5 min |
| Appearance: | White, opaque, many blisters smooth and glossy surface |
| Mechanical properties: | Flexible |
| Tensile strength at break: | <2 N/mm$^2$ |
| Elongation at break: | <50% |
| Tack: | None |
| Remarks: | No degassing |

Further Examples for preparing starch-based materials and/or shaped articles modified with synthetic polymer materials by coextruding starches with aqueous polymer dispersions are shown in the following Tables.

| | | Formulations | | | |
|---|---|---|---|---|---|
| | Feed of Solid (Starch, 20% water) kg/h | Feed of Liquid | | | |
| | | | Composition | | |
| Example No. | | Amount kg/h | Designation of the dispersion | Synthetic polymer wt % | Glycerol wt % | Water wt % |
| 5 | 3.0 | 3.0 | PM 4739 | 44.2 | 16.7 | 39.2 |
| 6 | 3.0 | 5.5 | PM 4739 | 53 | 0 | 47 |
| 7 | 3.0 | 3.7 | PM 4739 | 37.9 | 28.6 | 33.6 |
| 8 | 3.0 | 3.7 | PM 4739 | 37.9 | 28.6 | 33.6 |
| 9 | 4.2 | 2.8 | PM 4739 | 31.2 | 41.2 | 27.6 |
| 10 | 3.0 | 3.0 | PM 4239 | 30.6 | 44.4 | 25.0 |
| 11 | 3.0 | 7.0 | PM 4239 | 36.7 | 33.3 | 30.0 |
| 12 | 3.0 | 3.0 | PM 4239 | 32.4 | 41.2 | 26.5 |
| 13 | 4.9 | 9.5 | DM 155 | 37.0 | 31.5 | 31.5 |
| 14 | 2.2 | 2.2 | VN 4405 | 42.9 | 28.6 | 28.6 |
| 15 | 2.2 | 2.2 | PM 4239 | 31.2 | 41.2 | 27.6 |
| 16 | 3.0 | 4.5 | FA/MAH | 45.5 | 9.1 | 45.5 |
| 17 | 3.0 | 2.0 | FA/MAH | 45.5 | 9.1 | 45.5 |

-continued

| | Feed of Solid | Formulations | | | | |
|---|---|---|---|---|---|---|
| | | Feed of Liquid | | | | |
| | | | | Composition | | |
| Example No. | (Starch, 20% water) kg/h | Amount kg/h | Designation of the dispersion | Synthetic polymer wt % | Glycerol wt % | Water wt % |
| 18 | 2.1 | 2.1 | PM 4770 | 35.3 | 41.2 | 23.5 |
| 19 | 3.0 | 2.0 | PM 4770 | 40.8 | 23.1 | 36.2 |
| 20 | 2.5 | 2.5 | PM 4770 | 53.0 | 0 | 47.0 |
| 21 | 3.0 | 2.0 | Acr.81D | 53.0 | 0 | 47.0 |
| 22 | 4.0 | 1.0 | Acr.81D | 53.0 | 0 | 47.0 |

| | Composition of Raw Materials | | | |
|---|---|---|---|---|
| Example No. | Potato starch % by wt. | Synthetic polymer % by wt. | Glycerol % by wt. | Theoretical water content % by wt. |
| 5 | 40.0 | 22.1 | 8.3 | 29.6 |
| 6 | 28.0 | 34.5 | 0 | 37.5 |
| 7 | 44.0 | 17.0 | 12.9 | 26.1 |
| 8 | 44.0 | 17.0 | 12.9 | 26.1 |
| 9 | 48.0 | 12.5 | 16.5 | 23.0 |
| 10 | 40.0 | 15.3 | 22.2 | 22.5 |
| 11 | 24.0 | 25.7 | 23.3 | 27.0 |
| 12 | 40.0 | 16.2 | 20.6 | 23.3 |
| 13 | 27.2 | 24.4 | 20.8 | 27.6 |
| 14 | 40.0 | 21.8 | 13.9 | 23.9 removed |
| 15 | 40.0 | 16.2 | 20.6 | 23.3 |
| 16 | 32.0 | 27.3 | 6.0 | 34.7 |
| 17 | 48.0 | 18.2 | 4.0 | 29.8 |
| 18 | 40.0 | 17.7 | 20.6 | 21.8 |
| 19 | 48.0 | 16.3 | 9.2 | 26.5 |
| 20 | 40.0 | 26.5 | 0 | 32.2 |
| 21 | 48.0 | 21.2 | 0 | 30.8 |
| 22 | 64.0 | 10.6 | 0 | 25.4 |

| | Extrusion Parameters | | | | | |
|---|---|---|---|---|---|---|
| | Temperature heating medium 1st half °C. | Temperature heating medium 2nd half °C. | Extruder length | Torque % | Outlet temperature | |
| | | | | | Extruder measurement °C. | Separate measurement °C. |
| Example No. | | | | | | |
| 5 | 130 | 130 | 26 D | 34 | 130 | 160 |
| 6 | 130 | 130 | 26 D | 33 | 122 | 145 |
| 7 | 130 | 130 | 26 D | 33 | 127 | 162 |
| 8 | 110 | 110 | 26 D | 39 | 120 | 152 |
| 9 | 130 | 130 | 26 D | 33 | 120 | 147 |
| 10 | 130 | 130 | 26 D | 48 | 130 | 170 |
| 11 | 140 | 140 | 26 D | 24 | 128 | 145 |
| 12 | 115 | 115 | 26 D | 47 | 129 | 167 |
| 13 | 70 | 110 | 30 D | 14 | 80 | nd |
| 14 | 90 | 140 | 30 D | 30 | 125 | nd |
| 15 | 83 | 130 | 30 D | 30 | 105 | nd |
| 16 | 100 | 160 | 30 D | 5 | 80 | nd |
| 17 | 60 | 140 | 30 D | 9 | 101 | nd |
| 18 | 80 | 140 | 26 D | 16 | 105 | 130 |
| 19 | 80 | 145 | 26 D | 22 | 105 | 130 |
| 20 | 80 | 145 | 26 D | 24 | 95 | 120 |
| 21 | 80 | 150 | 26 D | 24 | 105 | 130 |
| 22 | 80 | 130 | 26 D | 30 | 106 | 135 | nd = not determined

| | Appearance/Properties of the Extrudate | | | | |
|---|---|---|---|---|---|
| Example No. | Color | Flexibility | Surface a) | Tack | Solubility in water at room temperature |
| 5 | white | brittle | 4 | no | swells |
| 6 | white | brittle | 3 | no | swells |
| 7 | white | brittle | 3 | no | swells |
| 8 | white | flexible | 1 | no | swells |
| 9 | white | flexible | 2 | no | swells |
| 10 | white | flexible | 1–2 | no | swells |
| 11 | white | flexible | 1 | no | swells |
| 12 | white | flexible | 3 | no | swells |
| 13 | white-beige | squashy | 3 | yes | decays |
| 14 | grey | brittle | 3 | no | / |
| 15 | white | flexible | 2 | no | / |
| 16 | yellowish | soft | 3 | yes | partially decays |
| 17 | white | brittle | 2 | no | decays |
| 18 | slightly grey | flexible | 2 | no | swells |
| 19 | slightly grey | flexible | 3 | no | swells |
| 20 | white | flexible | 2–3 | no | Swells |
| 21 | yellowish | flexible | 2 | no | swells |
| 22 | yellowish | brittle | 3 | no | swells | a) Evaluation of the surface:
1: Smooth and glossy
2: Smooth, but blistered, or non-uniform
3: Slightly rough
4: Porous
5: Tattered

The invention claimed is:

1. A process for making a polymer-modified starch based material, said process comprising steps of:
(A) providing an intimate mixture comprising:

(1) solid starch, and (2) an aqueous dispersion of a synthetic polymer, and, optionally, (3) a component selected from the group consisting of ethylene glycol, propylene glycol, butanediol, glycerol, and ethers, including partial ethers, thereof, and mixtures of any two or more of ethylene glycol, propylene glycol, butanediol, and ethers thereof, and (B) heating the mixture provided in step (A), while maintaining it in mixed condition, to a sufficient temperature for a sufficient time under sufficient pressure to convert the starch component of the mixture provided in step (A) into a homogenized mixture of thermoplasticized starch and synthetic polymer from component (2) of the mixture provided in step (A); and, optionally, (C) shaping the homogeneous mixture produced in step (B) into a solid article of manufacture.

2. A process according to claim 1, wherein the starch is in powder form in the mixture provided in step (A), the amount of starch in the homogeneous mixture produced in step (B) is at least about 40% by weight of the total solids in the mixture, and the amount in the homogeneous mixture produced in step (B) of the synthetic polymer in component (2) of the mixture is at least about 10% by weight of the total solids in the mixture.

3. A process according to claim 2, wherein the amount of starch in the homogeneous mixture produced in step (B) is more than about 50% by weight and the amount of synthetic polymer in component (2) of the mixture is in the range from about 25 to about 40% by weight of the total solids in the mixture; the content of water in the aqueous dispersion of synthetic polymer is within the range from 40–65% by weight; and the amount of component selected from the group consisting of glycerol, ethylene glycol, propylene glycol, butanediol, and ethers, including partial ethers thereof, and mixtures of any two or more of glycerol, ethylene glycol, propylene glycol, butanediol, and ethers thereof is at least about 10% by weight, based on the total mixture provided in step (A).

4. A process according to claim 3, wherein the synthetic polymer in component (2) is selected from the group consisting of polyurethanes, polyesters, polyamides, and homopolymers and copolymers of vinyl esters, styrene, acrylonitrile, and vinyl carbazole.

5. A process according to claim 4, wherein during at least part of said heating, the temperature is above 120° C., the pressure is the endogenous water pressure at that temperature, and the total time of exposure of the mixture to these conditions of temperature and pressure is not greater than 20 minutes.

6. A process according to claim 5, wherein step (B) is performed in a kneader or extruder, during at least part of step (B) the temperature is within the range from 140° to 170° C., the pressure is the endogenous water pressure at the temperature of the process, and the total time of exposure of the mixture to conditions of temperature within the range from 140° to 170° C. and endogenous water pressure at that temperature is within the range from 2 to 5 minutes.

7. A process according to claim 3, wherein step (B) is performed in a kneader or extruder, during at least part of step (B) the temperature is within the range from 140° to 170° C., the pressure during the process is the endogenous water pressure at the temperature of the process, and the total time of exposure of the mixture to conditions of temperature within the range from 140° to 170° C. and endogenous water pressure at that temperature is within the range from 0.5 to 10 minutes.

8. A process according to claim 2, wherein step (B) is performed in a kneader or extruder, during at least part of step (B) the temperature is in excess of 120° C., the pressure during the process is the endogenous water pressure at the temperature of the process, and the total time of exposure of the mixture to conditions of temperature in excess of 120° C. and endogenous water pressure at the temperature of the process is not more than 20 minutes.

9. A process according to claim 1, wherein during at least part of said heating, the temperature is above 100° C., the pressure is the endogenous water pressure at that temperature, and the total time of exposure of the mixture to conditions of temperature above 100° C. and endogenous water pressure at that temperature is not greater than 30 minutes.

10. A process according to claim 9, wherein step (B) is performed in a kneader or extruder, during at least part of step (B) the temperature is within the range from 140° to 170° C., the pressure is the endogenous water pressure at that temperature, and the total time of exposure of the mixture to conditions of temperature within the range from 140° to 170° C. and endogenous water pressure at that temperature is within the range from 0.5 to 10 minutes.

* * * * *